US010848956B2

(12) United States Patent
Ianev et al.

(10) Patent No.: US 10,848,956 B2
(45) Date of Patent: Nov. 24, 2020

(54) DEDICATED CORE NETWORKS (DCN) SELECTION

(71) Applicant: NEC Corporation, Tokyo (JP)

(72) Inventors: Iskren Ianev, Heidelberg (DE); Genadi Velev, Heidelberg (DE); Toshiyuki Tamura, Tokyo (JP); Andreas Kunz, Heidelberg (DE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/755,335

(22) PCT Filed: Oct. 5, 2016

(86) PCT No.: PCT/JP2016/004477
§ 371 (c)(1),
(2) Date: Feb. 26, 2018

(87) PCT Pub. No.: WO2017/061111
PCT Pub. Date: Apr. 13, 2017

(65) Prior Publication Data
US 2018/0249318 A1    Aug. 30, 2018

(30) Foreign Application Priority Data

Oct. 9, 2015  (EP) .................................... 15189240

(51) Int. Cl.
*H04W 8/06*      (2009.01)
*H04W 48/18*     (2009.01)
(Continued)

(52) U.S. Cl.
CPC ....... *H04W 8/065* (2013.01); *H04W 28/0215* (2013.01); *H04W 48/18* (2013.01);
(Continued)

(58) Field of Classification Search
CPC ...................................................... H04W 8/065
(Continued)

(56) References Cited

U.S. PATENT DOCUMENTS

| 2013/0294321 A1* | 11/2013 | Wang | ............... H04W 28/16 370/312 |
| 2015/0215774 A1* | 7/2015 | Huang | .................. H04W 76/11 455/422.1 |

(Continued)

FOREIGN PATENT DOCUMENTS

| CN | 101400148 A | 4/2009 |
| GB | 2541247 A | 2/2017 |

(Continued)

OTHER PUBLICATIONS

3GPP TR 23.707 V13.0.0 (Dec. 2014), 3rd Generation Partnership Project; Technical Specification Group Services and System Aspects; Architecture Enhancements for Dedicated Core Networks; Stage 2 (Release 13), 3GPP, (2014), pp. 1-34.

(Continued)

*Primary Examiner* — Shripal K Khajuria
(74) *Attorney, Agent, or Firm* — Finnegan, Henderson, Farabow, Garrett & Dunner, L.L.P.

(57) ABSTRACT

The invention provides for a method of selecting a Dedicated Core Network (DCN) based on assisting indication by mobile terminals, and including the step of configuring the RAN Nodes of the mobile network with the DCN Types of the serving EPC Nodes so that the RAN Nodes can map the DCN selection assisting information from the connecting mobile terminals with the right dedicated EPC Node. This allows for the RAN Node to connect the mobile terminals with EPC Node of the mobile terminal's dedication at initial attach and then keep the mobile terminals on the same DCN. Thus, a re-routing of mobile terminals NAS message from one EPC Node to another EPC node is avoided. The (Continued)

invention also allows for a flexible and dynamic change of the EPC Nodes dedication based on operator's configuration and policy. Additionally, the invention allows for DCN access restriction control by broadcasting of the supported DCN Types by the RAN Node.

7 Claims, 5 Drawing Sheets

(51) Int. Cl.
| | | |
|---|---|---|
| *H04W 76/30* | (2018.01) | |
| *H04W 76/14* | (2018.01) | |
| *H04W 76/27* | (2018.01) | |
| *H04W 28/02* | (2009.01) | |
| *H04W 60/00* | (2009.01) | |
| H04W 4/70 | (2018.01) | |

(52) U.S. Cl.
CPC .......... *H04W 60/00* (2013.01); *H04W 76/14* (2018.02); *H04W 76/27* (2018.02); *H04W 76/30* (2018.02); *H04W 4/70* (2018.02)

(58) Field of Classification Search
USPC ........................................................ 370/329
See application file for complete search history.

(56) References Cited

U.S. PATENT DOCUMENTS

| | | | |
|---|---|---|---|
| 2015/0249956 A1 | 9/2015 | Salot et al. | |
| 2018/0139762 A1* | 5/2018 | Cho ........................ | H04W 4/90 |

FOREIGN PATENT DOCUMENTS

| | | | |
|---|---|---|---|
| JP | 2014-116873 A | 6/2014 | |
| WO | WO 2012/036613 A1 | 3/2012 | |
| WO | WO 2013/065824 A1 | 5/2013 | |
| WO | WO 2015/0249956 | 4/2015 | |
| WO | WO-2015045296 A2 * | 4/2015 | ............ H04W 28/08 |
| WO | WO 2015/133078 | 9/2015 | |

OTHER PUBLICATIONS

3GPP TS 23.401 V13.4.0 (Sep. 2015), 3rd Generation Partnership Project; Technicai Specification Group Services and System Aspects; General Packet Radio Service (GPRS) enhancements for Evolved Universal Terrestrial Radio Access Network (E-UTRAN) access (Release 13), 3GPP, (2015), pp. 1-134.
Ericsson, "New SID: Study on Enhancements of Dedicated Core Network selection mechanism", 3GPP TSG SA WG-2 Meeting #110, S2-152661, (Jul. 2015), pp. 1-5.
3GPP TS 36.413 V13.0.0 (Jun. 2015), 3rd Generation Partnership Project; Technical Specification Group Radio Access Network; Evolved Universal Terrestrial Radio Access Network (E-UTRAN); S1 Application Protocol (S1AP) (Release 13), 3GPP, (2015), pp. 1-95.
NEC, "eDecor key Issue 1 solutions evaluation and conclusion", 3GPP TSG SA2 Meeting #113, S2-160112, (Jan. 2016), pp. 1-5.
NEC, "Dedicated Core Network (DNC) selection based on UE's indication to RAN", SA WG2 Meeting #111, S2-153211, (Oct. 2015), pp. 1-3.
NEC et al., "eDecor Key Issue 1—A merge between solutions 1 and 3", SA WG2 Meeting #114, S2-161572, (Apr. 2016), pp. 1-4.
International Search Report dated Jan. 16, 2017, in corresponding PCT International Application.
Written Opinion of the International Searching Authority from the Japanese Patent Office dated Jan. 16, 2017, in corresponding PCT International Application.
Examination Report dated Mar. 16, 2020, issued by the Indian Patent Office in counterpart Indian Patent Application No. 201817006020.
Office Action dated Feb. 25, 2020, by the Japanese Patent Office in counterpart Japanese Patent Application No. 2018-515165.
Office Action dated Mar. 16, 2020, issued by the Chinese Patent Office in counterpart Chinese Patent Application No. 201680049855.0.

* cited by examiner

[Fig. 1]
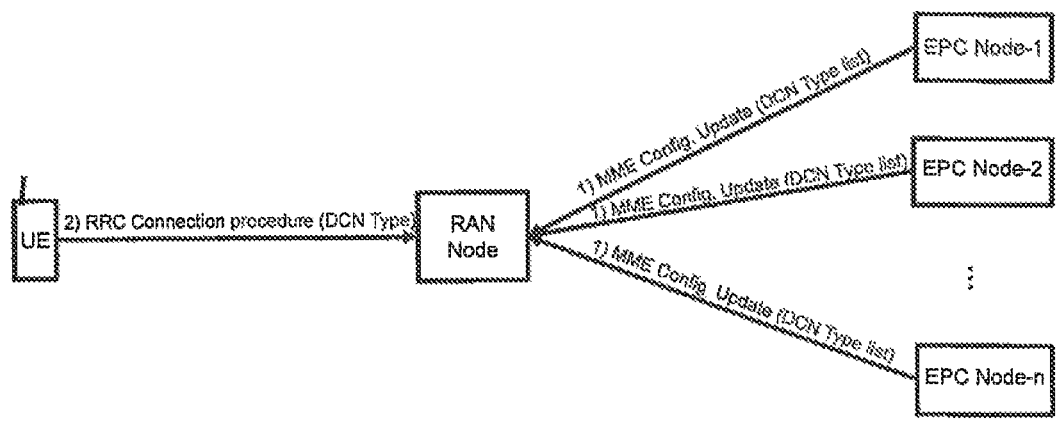
[Fig. 2]
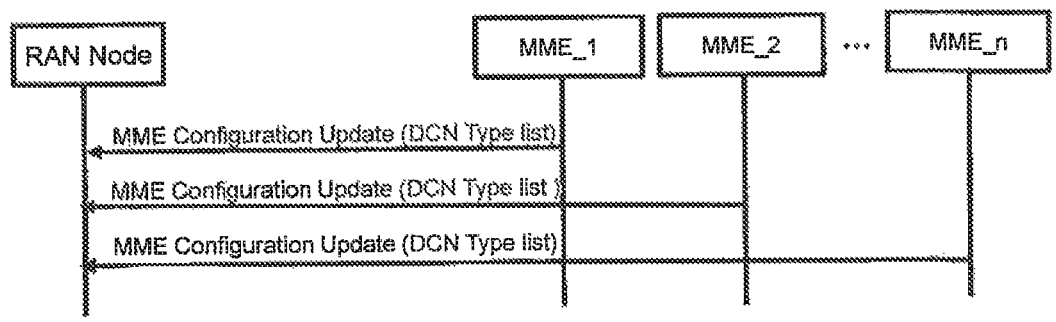

[Fig. 3]
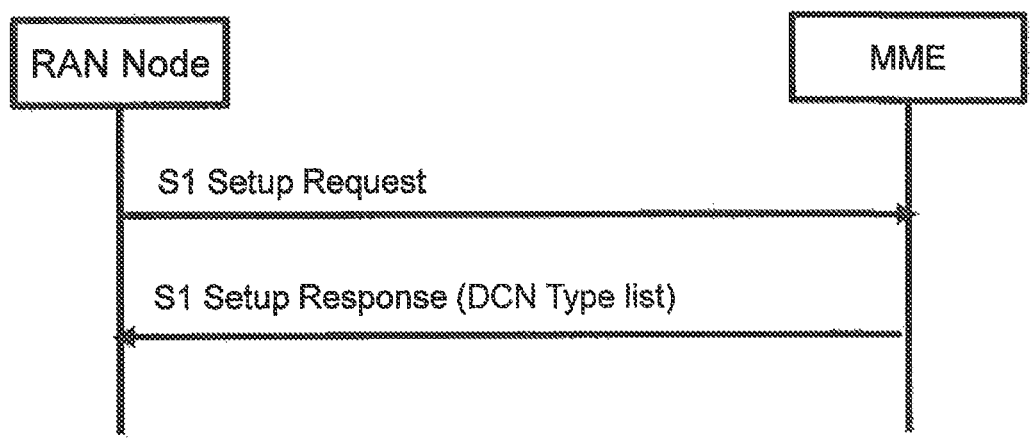

[Fig. 4]
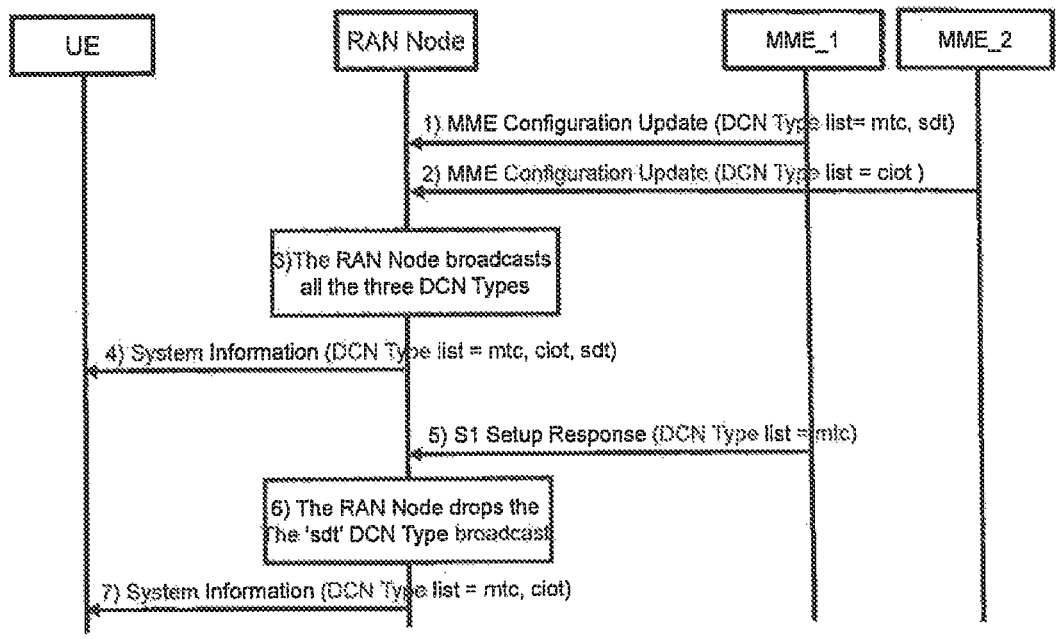
[Fig. 5]
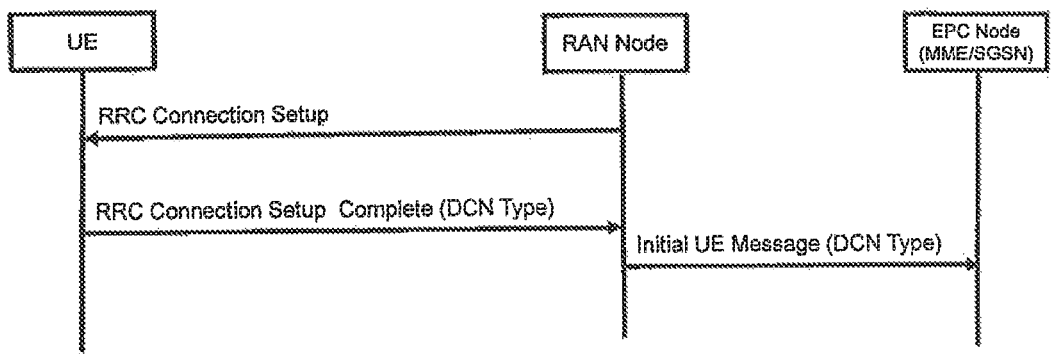

[Fig. 6]
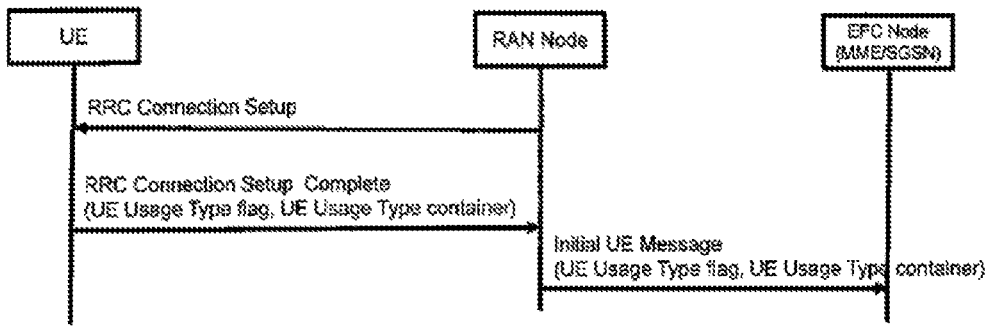
[Fig. 7]
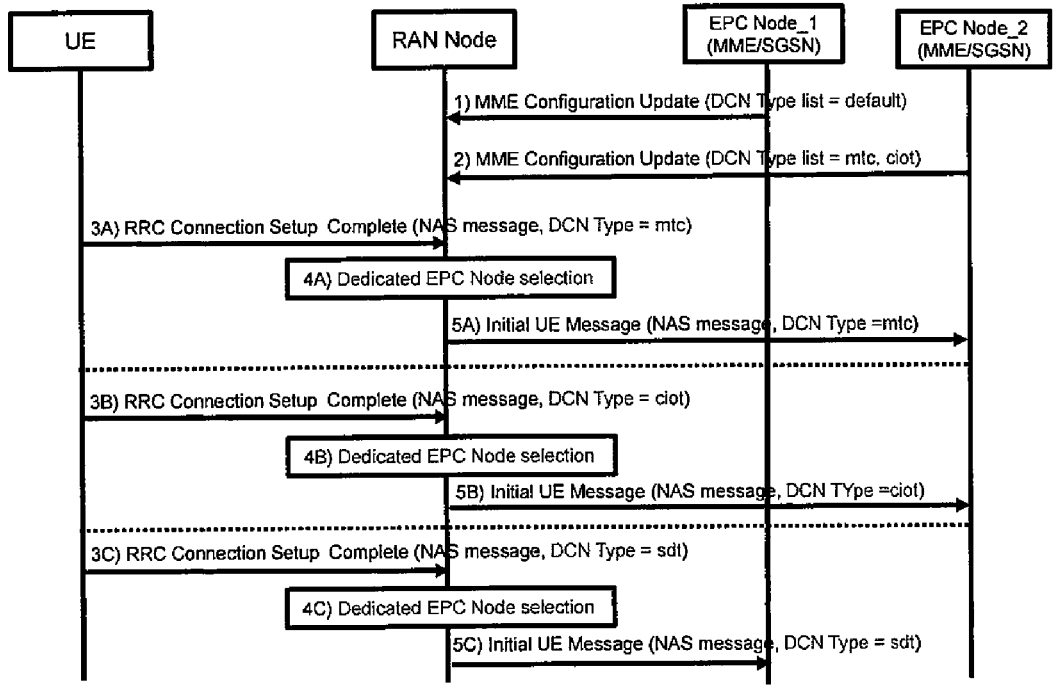

[Fig. 8]
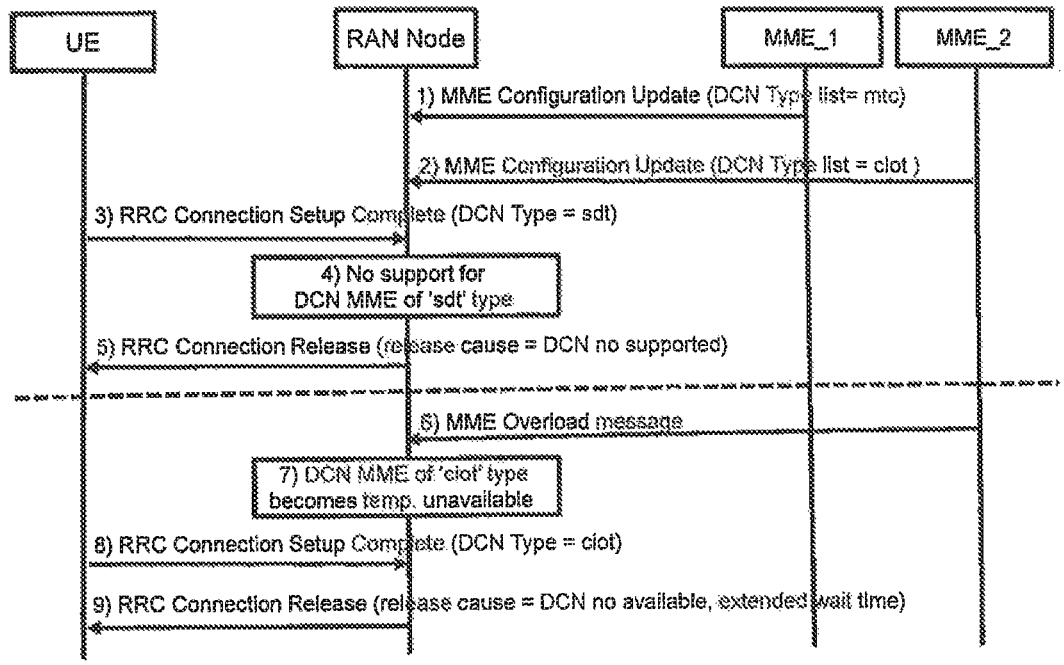
[Fig. 9]
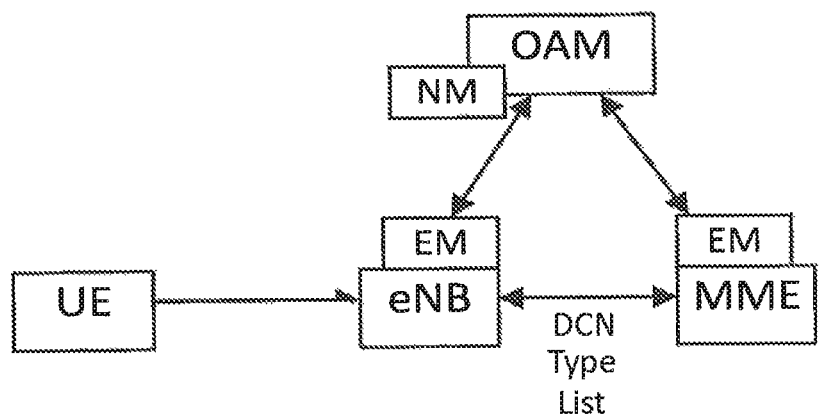
Exemplary architecture for the configuration of network nodes

US 10,848,956 B2

DEDICATED CORE NETWORKS (DCN) SELECTION

CROSS-REFERENCE TO RELATED PATENT APPLICATIONS

This application is a National Stage Entry of International Application No. PCT/JP2016/004477, filed Oct. 5, 2016, which claims the benefit of priority from European Application No. 15189240.3, filed Oct. 9, 2015. The entire contents of the above-referenced applications are expressly incorporated herein by reference.

TECHNICAL FIELD

This disclosure relates to a dedicated core networks (DCN) selection.

BACKGROUND ART

3GPP networks are beginning to support devices and customers with very different characteristics, such as device for Machine Type Communication (MTC), Internet of Things (IoT), data usage, etc. These classes of devices and customers may have different requirements from the core network in terms of optional feature support, traffic characteristic support, availability, congestion management, ratio of signalling to user plane traffic, etc. As we move forward, the classes of devices/customers will continue to increase.

TABLE 1

Abbreviations

| | |
|---|---|
| DCN | Dedicated Core Network |
| EM | Element Manager |
| eNB | evolved Node B |
| E-UTRAN | Evolved Universal Terrestrial Radio Access Network |
| GPRS | General Packet Radio Service |
| HSS | Home Subscriber Server |
| IoT | Internet of Things |
| MME | Mobility Management Entity |
| MMEG1 | MME Global Identity |
| MTC | Machine Type Communication |
| NAS | Non Access Stratum |
| NM | Network Manager |
| NNSF | NAS Node Selection Function |
| NRI | Network Resource Identifier |
| OAM | Operations, Administration and Management |
| PCRF | Policy and Charging Rules Function |
| PGW | Packet Data Network Gateway |
| RAU | Routing Area Update |
| RNC | Radio Network Controller |
| SDT | Small Data Transmission |
| SGSN | Serving GPRS Support Node |
| SGW | Serving Gateway |
| TAU | Tracking Area Update |
| UE | User Equipment |
| UTRAN | UMTS Terrestrial Radio Access Network |

One cost effective mechanism for operators to support these different classes of devices and customers is to create separate dedicated core networks consisting of specialized core network elements that are designed and deployed to meet the requirements of these different devices and customers. It is cost-effective as the network availability or redundancy requirements may be easier met with different hardware and/or software than the existing core network. Also, creating separate core networks enables independent scaling or specific feature provisioning for specific user or traffic types and isolating specific users and traffic from each other.

3GPP started work on standardisation of Dedicated Core Networks in Rel-13 (TR23.707) and agreed a network solution with no UE impact, see TS23.401, s4.3.2.5. This Rel-13 feature enables an operator to deploy multiple DCNs (Dedicated Core Networks) Within a PLMN with each DCN consisting of one or multiple core network nodes. Each DCN may be dedicated to serve specific type(s) of subscriber or devices. This is an optional feature and enables DCNs to be deployed for one or multiple RATs (GERAN, UTRAN and E-UTRAN).

When DCNs are supported (deployed), at initial access to the network, if sufficient information is not available for RAN to select a specific DCN, the RAN may selects a core network node from the default CN. A redirection to a DCN may then be required.

To redirect a mobile terminal from a default CN to a dedicated CN, the redirection procedure via RAN, described in clause 5.19.1 of TS23.401, is used to forward the NAS message from the UE to the target DCN. All selection functions are aware of DCN(s), including the network node selection function (NNSF) of RAN nodes, for selecting and maintaining the appropriate DCN for the UEs

SUMMARY OF INVENTION

Technical Problem

The Rel-13 DCN selection solution was not allowed to impact the UE so that it supports Rel-13 and earlier release mobile terminals. For this reason it has a main disadvantage— at initial access to the network a sufficient information is not available for RAN so that it can select the right dedicated DCN at the very beginning instead of selecting first a default EPC Node (e.g. MME or SGSN) and then rerouting the mobile terminal to the right DCN. This creates extra signalling and delay.

In Rel-14 the 3GPP has started a Work Item (S2-152661) on enhanced DCN with the following objectives:

Improve DCN selection mechanism by providing assistance information from the UE. This assistance information complements the Rel-13 DECOR mechanism. This can reduce the signalling required to register to and maintain a DCN. It can also improve isolation between dedicated core networks since there is no need for redirecting between different DCNs. The updated selection mechanism impacts the UE and RAN but the provisioning of the assistance information may impact the core network. It is advantageous if the solution works when the UE changes PLMNs.

It is however unclear how the RAN takes a decision for routing of the UE's message towards the core network.

With this new ongoing work the problem which this invention is trying to solve is how to enable the RAN Node (e.g. eNB or RNC or CIoT RAN) to take a decision about the routing of the UE's message (e.g. NAS message) towards the correct (dedicated) core network.

Solution to Problem

In one aspect, the invention provides a radio access network node comprising: a receiver configured to receive from a core network node connected to the radio access network node a message for configuring with a dedicated core network supported by the core network node.

In one aspect, the invention provides a communication method for a radio access network node, comprising: receiving from a core network node connected to the radio access network node a message for configuring with a dedicated core network supported by the core network node.

In one aspect, the invention provides a mobile terminal comprising: a transmitter configured to transmit to a radio access network node information for indicating a dedicated core network at registration to a new location in a network included in the radio access network node.

In one aspect, the invention provides a communication method for a mobile terminal comprising: transmitting to a radio access network node information for indicating a dedicated core network at registration to a new location in a network included in the radio access network node.

In one aspect, the invention provides a communication method for a communication system, comprising: receiving, by a radio access network, from a core network node connected to the radio access network node a message for configuring with a dedicated core network supported by the core network node; transmitting from a mobile terminal to the radio access network node information for indicating a dedicated core network at registration to a new location in a network included in the radio access network node; and selecting, by the radio access network node, the core network node based on the information for indicating the dedicated core network received from the mobile terminal.

BRIEF DESCRIPTION OF DRAWINGS

FIG. 1 illustrates a RAN Node configuration with the dedication type of the CN node.

FIG. 2 illustrates a list of supported DCN Types of the RAN Node within the MME Configuration Update message.

FIG. 3 illustrates the DCN Type list configuration in the RAN Node.

FIG. 4 illustrates one of the System Information messages/blocks a list of all supported DCN Types in that RAN Node.

FIG. 5 illustrates the DCN Type which can also be passed further, from RAN Node to the EPC Node within Initial UE Message or any other NAS message.

FIG. 6 illustrates that the RAN may forward the UE's UE Usage Type indication to the EPC Node within the S1-AP's Initial UE message.

FIG. 7 illustrates one practical exemplary of how to select the right DCN.

FIG. 8 illustrates a scenario where the network does not support a DCN from the same type that the UE has indicated to RAN Node during the RRC connection establishment.

FIG. 9 illustrates an exemplary architecture for the configuration of network nodes.

DESCRIPTION OF EMBODIMENTS

Solution Alternative 1.

The following solution in FIG. 1 is proposed to assist a Dedicated Core Network (DCN) selection by the mobile terminals based on the Dedicated Core Network type provided by the mobile terminals (DCN type, CIoT type, UE Usage Type or any other type of identity for a dedicated type of core network).

Step 1) RAN Node Configuration with the Dedication Type of the CN Node—Provide

RAN Nodes (eNB or RNC or CIoT RAN Node) with the DCN (Dedicated Core Network) Type(s) of the EPC Nodes (MME or SGSN or CIoT EPC Node) that RAN Node is connected to. The DCN Type of the EPC Node (MME/SGSN/CIoT EPC), i.e. the type of users, services or devices the EPC Node is specialised or dedicated for, could be identified with the same types that already were agreed by the 3GPP for identification of the UE subscription type in the HSS, i.e. 'UE Usage Type' (see TS23.401) or alternatively with MMEGI or NUL-NRI/SGSN Group Id that in 3GPP Rel-13 were agreed to identify a dedicated MME Pools or SGSN Pools. The MME's DCN Type could also be identified with so called 'MME Usage Type' (which would be the UE Usage Type per MME) that would allow compatibility with the already existing 'UE Usage Type' . . . . The DCN Types of the EPC Nodes (e.g. MMEs) may be configured via OAM or locally based on operator's configuration and policy.

The EPC Node indicates to the connected RAN Nodes the types of the users or mobile terminals (UEs) it is specialised to serve (DCN Type list) so that the RAN Node can select the right dedicated network when a UE connects to the RAN Node.

As mentioned above, one alternative would be when the UEs and EPC Nodes use the "UE Usage Type" as indication for DCN Type, but other indications can be used, as well. Another alternative is the MME's indication to the RAN node for DCN Type is different from the UE's indication to the RAN node. In this case, the RAN node needs to have internal mapping mechanism to map the DCN Type from the UE to the correct dedicated EPC Node. One example of the latter alternative is where the UE indicates in the DCN Type "delay tolerant", for example whereas the EPC Node (e.g. MME) indicates "M2M" DCN Type. The mapping between the UE's indication and the EPC Node's indication in the RAN node can be done via configuration over the OAM system, for example or via an internal logic in the RAN node.

In addition, DCN may have an associated DCN Profile and the DCN Profile can be also sent to RAN Node together with DCN Type. The DCN Profile may contain parameters that defines DCN characteristic that are specialized to serve predefined service(s). The DCN Type can be considered as a network slicing mechanism, thus an associated DCN Profile may define the network slice characteristics The DCN Type list (e.g. 'UE Usage Type' list or MMEGI/SGSN Group ID list) can be provided by the EPC Node to the RAN Node with the following messages:

Step 1A) MME Configuration Update Message.

During the MME configuration the MMEs provide a list of supported DCN Types to the RAN Node within the MME Configuration Update message (TS36.413, s8.7.5), see FIG. 2. This allows the RAN Nodes to be configured with information about the UE's DCN Type (e.g. 'UE Usage Type' or designated MMEGI) served by the MMEs that the RAN Node is connected to so that the RAN Node uses this information to select the right MME when the UE connects for service. If parameters other than 'UE Usage Type' are used for DCN Type, a mapping between the DCN Type indication and the UE subscription type may be required. This mapping needs to be configured in the RAN node.

Step 1B) S1 Setup Response Message (TS36.413, s9.1.8.5). During the S1 Setup procedure the EPC Node (e.g. MME) may provide or update the DCN Type list (e.g. 'UE Usage Type' list or MMEGI list) configuration in the RAN Node, see FIG. 3. This would allow not just for the DCN Type configuration in the RAN Node but for a dynamic configuration update of the DCN Type list in the RAN Node based on operator's policy or operator's configuration.

Step 1C)— any other signalling exchange between the EPC Node (MME or SGSN or CIoT EPC Node or any other name for the dedicated network node) could be used to configure the RAN Node with the specialization type of the dedicated EPC Nodes.

In yet another aspect applicable to any of the options 1A), 1B) or 1C) from above, it is possible that the RAN node may indicate to the EPC node whether the RAN node supports the feature of EPC node (e.g. MME) selection function based the DCN Type list from the EPC node. This kind of capability indication from the RAN node may be used by the EPC Node to make a decision whether DCN Type list needs to be set in the signalling from the EPC node to the RAN node. Especially in cases where the DCN type list announced from the EPC node may change frequently and the EPC nodes needs to update the RAN nodes in a frequent manner, so that updating only the supporting RAN nodes instead of all RAN nodes may be beneficial.

Once the RAN Node obtains the DCN Types from the associated EPC Nodes (e.g. MMEs) as shown in FIG. 2 and FIG. 3, the RAN Node may utilize DCN Type and associated DCN Profile to perform RAN slicing per service(s). If RAN Node receives the same DCN Type from multiple EPC Nodes, then RAN Node shall consider all DCN Profiles associated to the same DCN Type from different EPC Nodes as one aggregated network slice spanned to multiple EPC Nodes.

In one aspect, when the RAN Node obtains the DCN Types from the associated EPC Nodes (e.g. MMEs) as shown in FIG. 2 and FIG. 3, the RAN Node may broadcast in one of the System Information messages/blocks (over BCCH channel, for example) a list of all supported DCN Types (e.g. DCN Type list) in that RAN Node, see FIG. 4. This would allow the UEs to obtain an information about the supported DCN Types by the RAN Node and the UEs would attempt to connect only, if the DCN Type they are subscribed to, is supported. This would allow for an efficient DCN Access control by restricting the access to a specific DCN(s) when it is not supported in that RAN Node or temporary not available (overloaded or failure) or any other reason based on operators' policy and configuration. Thus, the extra signalling from access failures could be avoided and UE battery power saved.

If the RAN Node (based on operator's policy or configuration) is configured to select a default MME when an MME(s) of specific dedication are not available, then the RAN Node does not broadcast DCN Types list (i.e. no DCN access restriction).

In another aspect this can be also done on a per UE basis instead of a general configuration for all UEs at the RAN node, i.e. the EPC Node (e.g. MME) will provide the DCN Type list when the UE sends the initial UE message. The EPC node then can map for inbound roaming users the local (VPLMN) DCN Types to the ones supported in the HPLMN of said UE. For example, if the meaning of the UE Type is different in the different networks and the UE Usage Type sent by the UE is considered fixed for the time being, then at time of the initial attach to the VPLMN, the VPLMN EPC Node would receive the subscriber profile from the HPLMN EPC node including the DCN Type. The VPLMN EPC node would then chose the appropriate DCN Type for this UE and send it in the reply message e.g. in S1AP, to the RAN node. This means the same MME could send different support values to the same RAN node for different inbound roamers. The meaning of the DCN Type is then on a per UE granularity.

After receiving the 'DCN Type list' indication from the EPC node, the RAN node stores the 'DCN Type list' together with the EPC node ID (e.g. MME ID). The RAN node is able to generate a mapping table of all received DCN Types and the corresponding MME IDs. This mapping table can be used by the RAN node to select a direct match or the most appropriate serving node, to which to route the UE's NAS message, as there may be multiple serving nodes serving the same DCN type indicated from the UE.

Step 2). DCN Type Indication by Mobile Terminals (e.g. UE, MS, MTC Device, CIoT Device or any Other Type of 3GPP Compatible Terminal).

The UE can indicate its DCN Type ('UE Usage Type' subscription or MMEGI identity for the required dedicated resource or any other type of subscription indication or user characteristics or targeted service provider or targeted application which could have been preconfigured in the UE, SIM or UICC) during the RRC connection establishment procedure. The RAN node can select the right type of DCN (EPC Node like MME or SGSN or CIoT EPC Node) from the very beginning, i.e. avoiding any possibility for re-routing from a default EPC Node to a dedicated EPC Node. The DCN Type can be indicated within the RRC Connection Setup Complete message, see FIG. 5 or any other message within the connection establishment procedure or via NAS message.

The RAN Node has been configured with a list of DCN Types supported by each MME it is connected to, see step 1). During RRC Connection establishment the UE indicates its DCN Type ('UE Usage Type' or the MMEGI of a dedicated resource) which is used by the RAN Node to select the right MME to connect to. The UE can optionally indicate its DCN type only during RRC connection establishment for Mobile Originated (MO) services. If the RAN Node has been configured by the EPC Nodes with DCN Type different from the DCN Type received from the UE (e.g. in roaming scenarios where one or both, home and visited PLMNs deploy PLMN specific values for DCN Type or in non-homogeneous coverage of DCNs), a mapping between the DCN Type from the UE and the DCN Types from the EPC Nodes, based on operator's policy or configuration is required.

Other RRC Connection Establishment messages (e.g. RRC Connection Request) can also be used for indication the UE's DCN Type from the mobile terminal to the RAN Node where the behavior of the RAN Node would be similar or same to the case when the DCN Type indication from the UE is received within the RRC Connection Setup Complete message.

If the UE does not indicate any DCN Type to the RAN Node, then the RAN Node behavior would be as specified in TS23.401 for Rel-13—RAN Node would forward the UE to a default MME if there is no other available information about the UE's or user's DCN dedication.

Optionally, if RAN Node is not configured with the DCN Types (e.g. 'UE Usage Type', or MMEGI or any other way of identification for a dedicated EPC resource) or the RAN Node cannot decode the DCN Type indicated by the UE, the DCN Type can also be passed further, from RAN Node to the EPC Node (e.g. MME or SGSN or CIoT EPC Node) within Initial UE Message or any other NAS message, as shown in FIG. 5. So the EPC Node can analyse the DCN Type from the UE and map it to the right dedicated network, based on operator's policy or local configuration.

In another aspect (FIG. 6) the UE can indicate its DCN Type (e.g. subscribed UE Usage Type in a container within the above mentioned RRC messages (e.g. RRC Connection Setup Complete or RRC Connection Request or any other AS or NAS message), especially when DCN Type is a non-standardised one (e.g. the DCN Type is the UE Usage Type which has a PLMN specific value, see FIG. 6). A 'UE Usage Type' flag parameter in the above messages would indicate whether the 'UE Usage Type' in the UE Usage container is standardised or it is PLMN specific (e.g. a simple flag to indicate via I/O or True/False or Standardised/PLMN specific the type of the 'UE Usage Type' element in the UE Usage Type container.

If the 'UE Usage Type' is globally standardised, the 'UE Usage Type' container from the UE would be the standardised 'UE Usage Type value itself.'

If the 'UE Usage Type' is PLMN specific (non-standardised), the UE Usage Type container would contain:
- either the Home PLMN specific values for the 'UE Usage Type' in the UE Usage Type container which would be analysed by the RAN Node or the EPC node based on the operators roaming mapping and configuration and policies;
- or the Home PLMN provide the UE (over the air or via terminal/SIM/UICC configuration) with the 'UE Usage Type' values for the roaming partners so that the UE can use the visited PLMN's 'UE Usage Type' values in the UE Usage Type container when roaming.

FIG. 6 further shows that the RAN may forward the UE's UE Usage Type indication to the EPC Node within the S1-AP's Initial UE message. The UE Usage Type indication from the UE can be used by the EPC Node to verify (with the HSS for example) the validity of the UE subscription. In such a case there is no need for the UE to indicate the "DCN Type" in the NAS signalling. The RAN node may need to have internal processing unit in order to decide whether to forward the UE's indication over the AS signalling to the S1-AP signalling over the S1-MME interface. In one example the eNB may always forward the UE's AS indication on the S1-MME interface to the EPC Node. In another example the eNB may forward the UE's AS indication depending on the indication value. In yet another example the RAN node can forward the UE's AS indication depending whether the value of the UE's AS indication is known to the RAN node (or whether the RAN node is configured with the value) to map to any of the available DCNs.

The diagram in FIG. 7 demonstrate one practical example of how to select the right DCN based on the above steps.

1-2) EPC Nodes (e.g. MMEs) provide a list of supported DCN Type(s) to the RAN Node within the MME Configuration Message (TS36.413, s8.7.5) or any other message on the MME/eNB
interface. The DCN Type could be represented with the already 3GPP defined 'UE Usage Type' (i.e. the DCN Type values aligned with the 'UE Usage Type subscription values' in TS23.401 for Rel-13) or via MMEGI that is designated for a dedicated MME Pool or any other way of dedicated resource identification. This allows the RAN Nodes to be configured with information about the DCN Types served by the MMEs that the RAN Node is connected to so that the RAN Node uses this information to select the right MME when the UE connects for service. In the above example one of the MMEs is of 'default' type (a conventional, non-dedicated MME) and another one is of 'mtc' (Machine Type Communication) and 'ciot' (Cellular Internet of Things) types (e.g. 'mtc' and 'ciot' UE Usage Type values). It is also possible that default MMEs do not indicate any DCN Type list (e.g. it is not present or empty), which would mean that all DCN Types are supported.

This way the RAN Node is configured with the list of DCN Types supported by each MME the RAN Node is connected to.

3A) When a UE triggers RRC Connection establishment for a MO service the UE indicates (in the RRC Connection Setup Complete message, for example) its DCN subscription via DCN Type parameter='mtc', for example.

4A) Based on the DCN Type='mtc' indication from the UE, the RAN Node selects a 'mtc' dedicated EPC Node (from the same type as the DCN Type received from the UE). The RAN Node forwards the NAS message from the UE to the MME with 'mtc' type dedication along with the DCN Type indication parameter from the UE for subscription verification with the HSS.

3B) When UE triggers RRC Connection establishment for a MO service the UE indicates (in the RRC Connection Setup Complete message, for example) its DCN subscription via DCN Type parameter='ciot', for example.

4B) Based on the DCN Type='ciot' indication from the UE, the RAN Node selects a 'ciot' dedicated EPC Node (from the same type as the DCN Type received from the UE). The RAN Node forwards the NAS message from the UE to the MME with 'ciot' type dedication along with the DCN Type indication parameter from the UE for subscription verification with the HSS.

3C) If a UE triggers RRC Connection establishment for a MO service the UE indicates (in the RRC Connection Setup Complete message, for example) its DCN subscription via DCN Type parameter='sdt', for example 4C) Based on the DCN Type='sdt' (Small Data Transmission) indication from the UE, the RAN Node attempts to select a 'sdt' dedicated EPC Node (from the same type as the DCN Type received from the UE). As a dedicated MME from 'sdt' type dedication is not available, the RAN Node, based on operators configuration or policy, either
- forwards the NAS message from the UE to the MME with 'default' type dedication along with the DCN Type indication parameter from the UE. The default MME, depending on the operator's configuration can serve the UE or reject the NAS message from the UE with back-off timers included in the reject or alternatively forward the NAS message from the UE to an MME from different dedication if required by operator's policy or configuration; or
- the RAN Node forwards the NAS message from the UE to another dedicated resource (MME) again, based on the local configuration or operator policies.

The diagram in FIG. 8 illustrates a scenario where the network does not support a DCN from the same type that the UE has indicated to RAN Node during the RRC connection establishment (e.g. in the RRC Connection Setup Complete message or RRC Connection Request message or any other RRC signalling). i.e. RAN Node is not associated with a dedicated network from the 'DCN Type' indicated by the UE. In this case, one possible behaviour (other than forwarding the UE to a default EPC Node) is that the RAN Node rejects the UE by releasing the already created RRC connection via RRC Connection Release message returned to the UE along with a new release cause, e.g.:
- 'DCN not supported' (or any other name with similar meaning)—a DCN of the DCN type indication by the UE is not supported by this RAN Node.
- 'DCN not available' (or any other name with similar meaning)—the DCN is temporary not available because of failure or any other reason.

On receiving the RRC Connection Release message with the release cause:
- 'DCN not supported—the UE shall not initiate another attempt for RRC connection to the same DCN while the UE is in the same TA/LA;

'DCN not available'—the UE shall not initiate another attempt for RRC Connection establishment while the UE is in the same Cell. If an 'extended wait timer' is present in the RRC Connection Release message, the UE can try another RRC connection establishment in the same cell when the 'extended wait timer' expires.

Solution Alternative 2:

Another possible solution of the described problem is to configure the RAN nodes (e.g. eNBs) in a proper way to forward the UE's message to the correct DCN. This configuration can be e.g. done over the OAM system. Alternative 2 is a more static way of configuration via the OAM. Thus, this solution is applicable to networks whose DCN configuration does not change frequently.

FIG. 9 shows an exemplary architecture how to configure the RAN node and serving network node, more particular a base station, eNB and MME, using the Operations, Administration and Management (OAM) system. Usually the RAN node (e.g. eNB), and the network node (e.g. MME) implements an Element Manager (EM). The EM is connected to the network manager (NM) which is part of the OAM system operated by the network operator.

In the particular scenario of this invention, the network operator can use the OAM system to configure the RAN nodes (eNBs) with the particular mapping of the UE's DCN Type indication and the serving node configured to serve the particular DCN Indication. The OAM system can be also used to configure the serving network node with the corresponding DCN types. The eNB is able to route the UE's NAS message to the correct serving network node based on the 'DCN type' indication from the UE. With other words the configuration of the RAN node to map the 'DCN type' indication from the UE to the available DCN types of the serving node is similar as the configuration of the eNB from Alternative 1 above.

The configuration can be done in a kind of table containing e.g.

UE "DCN type" indication maps to MMEGI(s) or SGSN group ID.

UE "DCN type" indication maps to MME ID or SGSN ID.

Having such a configuration, the eNB can take a decision how to select a particular serving node (MME) to which the UE's NAS message is forwarded.

Although the proposed solutions in this invention mostly use 4G terminology in the description and examples (UE, MME, eNB and etc.) the solutions are equally applicable to 3G/2G technology (including terminal indicated as MS, and network nodes SGSN, MSC, RNC, Base Station and etc.) as to any old or new 3GPP compatible technology, IoT networks and terminals and more.

SUMMARY OF THE ASPECTS OF THE DISCLOSURE

1. MME Configuration Update (DCN Type list)—New parameter DCN Type list in the MME Configuration Update message that contains the list of the DCN Types (e.g. UE Usage Types or MMEGI or any other way of identification for a dedicated EPC resource) supported by the connected MME. This allows the MMEs (connected to a specific RAN Node) to configure that RAN Node with the DCN Types they are dedicated to serve.

2. RRC Connection Setup Complete (DCN Type)—New parameter DCN Type in RRC Connection Setup Complete message (or any other AS or NAS message from the UE) so that the UE can indicate to the RAN Node its subscription for dedicated network (e.g. via 'UE Usage Type' or MMEGI or any other way to identify the UE's dedicated network subscription).

In an alternative implementation two new parameters could be added to the RRC Connection Setup message—RRC Connection Setup Complete (UE Usage Type flag, UE Usage Type container) to cover roaming between PLMNs where one or both of the PLMNs uses PLMN specific values for the UE Usage Type. In this case the UE Usage flag would indicate whether the UE Usage Type value in the UE Usage Type container from the UE is a standardized one or PLMN specific one.

3. Dedicated EPC Node selection by RAN Node (e.g. eNB)—Based on the configuration by the MME with the DCN Type list and the DCN Type indication from the UE, the RAN Node selects the right dedicated EPC Node to service the UE.

4. Initial UE Message (DCN Type)—New parameter in the Initial UE Message so that the dedicated MME can verify the UE subscription for DCN or alternatively, when the dedicated core network selection would be made by the EPC Node (e.g. when the dedicated resource selection information in the RAN Node is still insufficient).

5. RRC Connection Release (release cause)—RAN Node can reject the UE when a dedicated network of the DCN Type indicated by the UE is not available or not supported. The new values for the release cause—DCN not supported and DCN not available.

6. DCN Type list broadcast in the System Information—RAN Node may broadcast the list of DCNs supported by it—DCN access control by the RAN Node. If a default MME is present in the MME Loop (service area), the RAN Node may not broadcast any DCN Type list as it is possible that the default MME is configured (based on the operator's policy) to serve the UEs for which there is no DCN support.

Exemplary Advantages of the Disclosure

1. UE NAS Message Reroute is avoided. As the UE provides its subscription for dedicated network via the DCN parameter and also the RAN Node is configured with the MME's DCN Types, the RAN Node can select the right dedicated resource without having to forward the NAS message from the UE to a default MME 2. Improved Load Balancing by the RAN Node. As the RAN Node is provided with the DCN Types supported by the connected MMEs, the RAN Node can select a dedicated MME by applying the existing load balancing principles only for MMEs of the same DCN Type.

This application is based upon and claims the benefit of priority from EP Patent Application No. 15189240.3, filed on Oct. 9, 2015, the disclosure of which is incorporated herein in its entirety by reference.

The invention claimed is:

1. A radio access network node comprising:
a first receiver configured to receive, from a core network node coupled to the radio access network node, a message for configuring with at least one network slice supported by the core network node, wherein the message includes first information for the at least one network slice;
a transmitter configured to transmit second information indicating availability of the at least one network slice;
a second receiver configured to receive, from a mobile terminal which receives the second information, a Radio Resource Control (RRC) setup complete message including third information indicating a first network slice from among the at least one network slice;

a memory storing instructions; and at least one processor configured to process the instructions to select a core network node specific for the first network slice based on the third information indicating the first network slice.

2. The radio access network node according to claim 1, wherein the message is received via Operation And Maintenance functions.

3. A communication method in a radio access network node, comprising:

receiving, from a core network node coupled to the radio access network node, a message for configuring with at least one network slice supported by the core network node, wherein the message includes first information for the at least one network slice;

transmitting second information indicating availability of the at least one network slice;

receiving, from a mobile terminal which receives the second information, a Radio Resource Control (RRC) setup complete message including third information indicating a first network slice from among the at least one network slice; and selecting a core network node specific for the first network slice based on the third information indicating the first network slice.

4. The communication method according to claim 3, wherein the message is received via Operation And Maintenance functions.

5. A mobile terminal comprising:

a receiver configured to receive, from a radio access network node, second information indicating availability of at least one network slice; and a transmitter configured to transmit to the radio access network node, a Radio Resource Control (RRC) setup complete message including third information indicating a first network slice from among the at least one network slice, and wherein the mobile terminal is served by a first core network node which is selected by the radio access network node based on the third information indicating the first network slice, the at least one network slice being indicated by a message including first information for the at least one network slice, received from a second core network node which supports the at least one network slice.

6. A communication method for a mobile terminal comprising:

receiving, from a radio access network node, second information indicating availability of at least one network slice; and transmitting to the radio access network node, a Radio Resource Control (RRC) setup complete message including third information indicating a first network slice from among the at least one network slice, wherein the mobile terminal is served by a first core network node which is selected by the radio access network node based on the third information indicating the first network slice, the at least one network slice being indicated by a message including first information for the at least one network slice, received from a second core network node which supports the at least one network slice.

7. A communication system, comprising:

a radio access network node;

a mobile terminal; and a core network node, wherein the radio access network node is configured to:
receive, from the core network node, a message for configuring with at least one network slice supported by the core network node, wherein the message includes first information for the at least one network slice; and transmit second information indicating availability of the at least one network slice, the mobile terminal is configured to:
receive the second information; and transmit to the radio access network node, a Radio Resource Control (RRC) setup complete message including third information indicating a first network slice from among the at least one network slice, and the radio access network node is further configured to:
select a core network node specific for the first network slice based on the third information indicating the first network slice.

* * * * *